US006749773B2

(12) United States Patent
Emanuel

(10) Patent No.: US 6,749,773 B2
(45) Date of Patent: Jun. 15, 2004

(54) PHOSPHORESCENT INK FOR USE IN AN INK-JET PRINTER

(75) Inventor: Jeffrey V. Emanuel, Livermore, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 09/825,620

(22) Filed: Apr. 3, 2001

(65) Prior Publication Data

US 2002/0139279 A1 Oct. 3, 2002

(51) Int. Cl.$^7$ ............... C09K 11/02; C09D 5/22
(52) U.S. Cl. ............... 252/301.36; 106/31.32; 106/31.64
(58) Field of Search ............ 106/31.32, 31.64; 252/301.36, 301.4 R, 301.4 P, 301.41, 301.45, 301.5, 301.6 R, 301.6 S, 301.6 P, 301.6 F

(56) References Cited

U.S. PATENT DOCUMENTS

| 4,149,989 | A | * | 4/1979 | Kashiwada et al. ... 252/301.4 P |
| 4,597,794 | A | | 7/1986 | Ohta et al. ............ 106/20 |
| 5,085,698 | A | | 2/1992 | Ma et al. ............. 106/20 |
| 5,172,133 | A | | 12/1992 | Suga et al. ........... 346/1.1 |
| 5,554,842 | A | * | 9/1996 | Connell et al. ........ 235/491 |
| 5,569,317 | A | * | 10/1996 | Sarada et al. ......... 524/111 |
| 5,611,958 | A | * | 3/1997 | Takeuchi et al. ...... 252/301.4 P |
| 5,766,324 | A | * | 6/1998 | Ikegaya et al. ........ 106/31.15 |
| 6,086,198 | A | | 7/2000 | Shields et al. ........ 347/100 |
| 6,108,643 | A | | 8/2000 | Sansone .............. 705/62 |
| 6,117,362 | A | | 9/2000 | Yen et al. ........... 252/301.4 |
| 6,197,218 | B1 | * | 3/2001 | Hampden-Smith et al. ... 252/301.4 R |
| 2002/0092441 | A1 | * | 7/2002 | Leu et al. ........... 106/31.6 |

FOREIGN PATENT DOCUMENTS

| EP | 0940265 A2 | 9/1999 |
| GB | 1474451 | 5/1977 |
| WO | WO 98/40223 | 9/1998 |
| WO | WO 00/63317 | 10/2000 |

* cited by examiner

Primary Examiner—C. Melissa Koslow

(57) ABSTRACT

A phosphorescent ink composition suitable for use with an ink-jet printer and method of producing said composition are provided. The composition includes a mixture of an effective amount of a phosphorescent powder and a liquid ink vehicle. A method of producing the phosphorescent ink-jet ink composition includes the step of mixing an effective amount of a phosphorescent powder with a liquid ink vehicle. The ink composition may optionally include a dispersing agent for maintaining disbursement of the phosphorescent powder in the ink vehicle. The composition may also include a colorant.

15 Claims, No Drawings

PHOSPHORESCENT INK FOR USE IN AN INK-JET PRINTER

THE FIELD OF THE INVENTION

The present invention relates to phosphorescent ink compositions for use in ink-jet printers. More particularly, the present invention relates to an ink-jet ink composition which includes a phosphorescent material while retaining acceptable print performance in an ink-jet pen.

BACKGROUND OF THE INVENTION

Essentially all ink-jet inks are of two types: dye-based and pigment-based. Dye-based inks utilize a dye as a colorant that is dissolved in the ink vehicle. Therefore, most dye-based inks are non-particulate. Pigment-based inks, on the other hand, utilize a particulate colorant that is dispersed or suspended in an ink vehicle. Although there have been a number of advances made in dye-based inks, these inks still suffer from printing performance deficiencies with respect to various characteristics such as, water fastness, smear resistance, edge acuity, and lightfastness when used on various of print media. In contrast, because of their physical properties, pigment-based inks generally provide better images on many print media, because of their ability to achieve high optical density and sharp edge acuity with good water fastness, smear resistance and lightfastness. Additionally, pigment inks generally offer greater optical density, which provides richer, deeper color.

Glow-in-the-dark, or phosphorescent, articles are popular items in many consumer and industrial markets. Generally, when a phosphorescent material is exposed to a source of energy (e.g. light), it absorbs that energy, placing its atoms in an excited state. Over time, the energy level of the material drops back to its normal state. During this process, the atoms emit photons which can be seen as visible light, thereby creating a luminescence, or glow, that is still visible after the source of energy has been removed.

Many phosphorescent materials are unsuitable for use in an ink-jet ink composition because of the stringent ink-jet performance requirements. Problems may particularly arise with kogation, particulate size, print velocity, and interaction with other ink vehicle components.

SUMMARY OF THE INVENTION

It has been recognized that a phosphorescent ink composition which is suitable for use in ink-jet printers would be advantageous. Accordingly, the present invention provides an ink composition for use in an ink-jet printer comprising a mixture of an effective amount of a phosphorescent powder and a liquid ink vehicle.

The composition may optionally include a dispersing agent for maintaining disbursement of the phosphorescent material in the ink vehicle. In one embodiment, the phosphorescent powder may have average particle size of less than about 5 micrometers. In another embodiment, the phosphorescent powder may have an average particle size of less than about 1 micrometer.

One or more colorants may also be dispersed within the ink vehicle, in addition to the phosphorescent powder, such that the ink composition has the appearance of a conventional ink. The colorant may be, but is not limited to, a pigment or dye.

The ink vehicle used in the present composition is an aqueous or solvent based liquid that may additionally include one or more of the following ingredients: surfactants, defoamers, biocides, cosolvents, conductivity enhancing agents, anti-kogation agents, and drying agents. The ink vehicle can be present in amounts of between 60%–99.899% by weight of the composition.

The amount of phosphorescent powder may be from about 0.1% to about 20% by weight of the ink composition. Similarly, the amount of colorant may be from about 0.1% to about 20% by weight of the ink composition.

The present invention also provides a method of producing a phosphorescent ink-jet ink composition. In one aspect, such a method may include the step of mixing an effective amount of a phosphorescent powder with an ink vehicle.

The method of producing the phosphorescent ink composition may also include the step of adding a dispersing agent. In one embodiment, the average particle size of the phosphorescent powder may be less than about 5 micrometers. In another embodiment, the average particle size of the phosphorescent powder may be less than about 1 micrometer.

A colorant may be dispersed within the ink vehicle, such that the ink composition has the appearance of a conventional ink. This colorant may be, but is not limited to, a dye or a pigment.

The mixing of an effective amount of a phosphorescent powder with an ink vehicle may be accomplished by various processes known to those ordinarily skilled in the art. In one aspect, the mixing process may be milling.

There has thus been outlined, rather broadly, the more important features of the invention so that the detailed description thereof that follows may be better understood, and so that the present contribution to the art may be better appreciated. Other features of the present invention will become clearer from the following detailed description of the invention or may be learned by the practice of the invention.

DETAILED DESCRIPTION OF THE INVENTION

Before the present ink-jet ink composition and associated method of making an ink-jet ink composition are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

A. Definitions

In describing and claiming the present invention, the following terminology will be used.

The singular forms "a," "an," and, "the" include plural referents unless the context clearly dictates otherwise. Thus, for example, reference to "a pigment" includes reference to one or more of such pigments, reference to "an ink" includes reference to one or more of such inks, and reference to "the color" includes reference to a mixture of one or more of such colors.

As used herein, "ink" refers to a composition for application to a print medium, which meets the accepted performance requirements known to those skilled in the art as being suitable for use in an ink-jet printer.

As used herein, "phosphorescent" refers to any substance containing electrons which temporarily enter an excited state upon exposure to a source of energy, such as light or electricity, and emit photons of visible light as they return to a normal state thereby creating a luminescence, or glow, that is still visible after the source of energy has been removed.

As used herein, "powder" refers to a substance in particulate form which has an average particle size that is suitable for use with ink-jet nozzle, according to well established parameters known to those skilled in the art.

As used herein, "colorant" refers to a dye or pigment for use with an ink vehicle to create an ink-jet ink.

As used herein, "conventional ink" refers to any ink that is not phosphorescent.

As used herein, "milling" refers to the process whereby ingredients of the ink composition, including phosphorescent material and an ink vehicle, are blended together such that the phosphorescent powder is dispersed and deaggregated to an average particle size that is suitable for use with ink-jet nozzle.

As used herein, "disbursement" refers to distributing or placing pigment particles, or a colorant, such as phosphorescent particles, within an ink vehicle.

As used herein, "dispersing agent" refers to any substance that prevents pigment particles or phosphorescent particles, from agglomerating or otherwise settling out of the ink vehicle.

As used herein, "effective amount" refers to the minimal amount of a substance or agent, which is sufficient to achieve a desired effect. For example, an effective amount of an "ink vehicle" is the minimum amount required in order to create ink, which will meet specified performance and characteristic standards. Additionally, the effective amount of a "phosphorescent powder" would be the minimum amount that provides the desired luminescence, but not such large quantities of phosphorescent powder as would clog or otherwise render unusable an ink-jet nozzle.

As used herein, "ink vehicle," refers to an aqueous or solvent base in which a colorant and other additives are placed to form ink. Ink vehicles are well known in the art, and a wide variety of ink vehicles may be used with the ink composition of the present invention. Such ink vehicles may, in addition to the aqueous or solvent base, include a mixture of a variety of different agents, including without limitation, surfactants, co-solvents, buffers, biocides, viscosity modifiers, and surface-active agents.

B. The Invention

The present invention relates to combining the luminescent properties of phosphorescent materials with an ink composition having the desirable printing characteristics of a pigment-based ink-jet ink. Specifically, one aspect of the invention is an ink composition for use in an ink-jet printer comprising a mixture of an effective amount of a phosphorescent material and an ink vehicle.

In one embodiment, an amount of phosphorescent material, from about 0.1 to about 20% by weight of the ink composition, is combined with an ink vehicle having a dispersing agent. The amount of the dispersing agent may be from about 0.001 to about 20% by weight of the ink composition.

In one embodiment, the phosphorescent material, the dispersing agent and the ink vehicle is milled according to conventional milling techniques. Such conventional milling techniques include, but are not limited to, ball mills, media mills, high speed dispersers, and roll mills. Typically, in the milling process, a grinding media is also added to effect the deaggregation of the phosphorescent material. Various grinding media are well known in the art.

Through the milling process, the phosphorescent material is deaggregated into an average particle size that is suitable for use with an ink-jet printer. In general, particles should be less than about 20 micrometers in order to be suitable for use in an ink-jet printer. The milling process also serves to disperse the phosphorescent material throughout the ink vehicle. Such disbursement is important to prevent printer malfunction over time due to kogation or clogging of the print head nozzle, which is caused by particle agglomeration.

Once the milling process is complete, the mill grind may then be further diluted to provide an ink suited for use in an ink jet printer. Frequently, dilution is accomplished by adding ingredients such as cosolvents from about 5 to about 50 percent by weight of the ink composition. These cosolvents are added to help prevent the ink from drying out or clogging the ink-jet nozzle, as well as to help the ink composition penetrate the printing medium. Examples of cosolvents include, but are not limited to, glycerol, ethylene glycol, and diethylene glycol, and mixtures thereof, at overall concentrations ranging from about 5 to about 50 wt %.

The end product of the milling process is an ink that has small, discrete particles of phosphorescent powder suspended within an ink vehicle. Because of the small particle size of the phosphorescent powder, and the relatively uniform distribution of the particles, the resultant ink is well suited for use with an ink-jet printer.

It is noted that there are a wide variety of phosphorescent materials that may be utilized with the present invention. Examples of phosphorescent materials include, but are not limited to, CaS:Bi (which emits light of violet blue), CaSrS:Bi (which emits light of blue), ZnS:Cu, (which emits light of green), ZnCdS:Cu (which emits light of yellow or orange), ZnS:Cu,Co and CaSrS:Bi. Additional phosphorescent materials are disclosed in U.S. Pat. No. 6,117,362, which is herein incorporated by reference.

It is further noted that there are a variety of dispersants well known in the art that may be used in connection with the present invention. Optimal dispersants will depend on not only the specific ink vehicle used, but also on the phosphorescent materials and colorants used, and can be readily identified by those of ordinary skill in the art. Examples of dispersants include, without limitation, polymers and copolymers of styrene sulfonate salts (e.g., $Na^+$, $Li^+$, $K^+$, $Cs^+$, $Rb^+$, substituted and unsubstituted ammonium cations, etc.); naphthalene sulfonates salts (e.g., $Na^+$, $Li^+$, $K^+$, $Cs^+$, $Rb^+$, substituted and unsubstituted ammonium cations (e.g., trimethylammonium salt, dimethylammonium salt, ammonium salt, etc.)); and various aldehyde derivatives (e.g., alkyl aldehyde derivatives including formaldehyde, acetaldehyde, propylaldehyde, etc.); and mixtures thereof. Other examples of dispersants include commercial products such as LOMAR® (available from Henkel Corporation of Ambler, Pa.) and DAXAD® (available from W. R. Grace of Lexington, Mass.). Oleoyl methyl taurine (OMT), sodium dodecyl sulfate, acrylic and styrene-acrylic copolymers, such as those disclosed in U.S. Pat. Nos. 5,085,698 and 5,172,133, sulfonated polyesters and styrenics, such as those disclosed in U.S. Pat. No. 4,597,794, and amine dispersants such as those disclosed in U.S. Pat. No. 6,086,198 may also be utilized. Each of these patents is herein incorporated by reference in its entirety.

Many well-known aqueous or solvent based liquid ink vehicles may be used in combination with the combination of dyes disclosed herein to produce the ink composition of the present invention. A variety of ingredients in varying amounts may be included in the ink vehicle of the present composition, such as organic solvents and co-solvents, surface-active agents, buffers, viscosity modifiers, biocides, surfactants, and metal chelators.

Water may make up a large percentage of the overall ink vehicle of the present invention. In one aspect, the water may be deionized water in an amount of from about 60 to 99.899 percent by weight of the ink composition. Various deionization techniques and states for water are known. In one aspect, the water may be deionized at 18 Mohm.

An organic solvent, or co-solvent component of the ink vehicle may be a water-soluble solvent, and may be present in an amount of from about 5 to about 50 percent by weight.

One or more solvents may be used to achieve the amount specified above. Further, when a mixture of solvents is used, the combination may be included in a variety of ratios when necessary to achieve a specific result.

Examples of suitable solvents include without limitation: nitrogen-containing heterocyclic ketones, such as 2-pyrrolidone, N-methyl-pyrrolid-2-one, 1,3-dimethylimidazolid-2-one, and octyl-pyrrolidone; diols such as ethanediols, (e.g., 1-2-ethandiol), propanediols (e.g., 1,2-propanediol, 1,3-propanediol, 2-ethyl-2-hydroxy-methyl-1, 3-propanediol, ethylhydroxy-propanediol ), butanediols (e.g., 1,2-butanediol, 1,3-butanediol, 1,4-butanediol), pentanediols (e.g., 1,5-pentanediol), hexanediols (e.g., 1,6-hexanediol, 2,5-hexanediol), heptanediols (e.g., 1,2-heptanediol, 1,7-heptanediol), octanediols (e.g., 1,2-octanediol, 1,8-octainediol); and glycols, glycol ethers and thioglycol ethers, commonly employed in ink-jet inks, such as polyalkylene glycols such as polyethylene glycols (e.g., diethylene glycol, triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

When included, the surfactant ingredient may be added in an amount of up to about 15 percent by weight of the ink composition. In one aspect, the surfactant may be present in an amount of from about 0.01 to about 4%. In yet another aspect, the surfactant may be present in an amount of about 2.25 percent by weight of the ink composition. Such amounts may be achieved using a single surfactant ingredient, or a mixture of surfactant ingredients as indicated below.

Generally, surfactants are used in order to increase the penetration of the ink into the print medium. A wide variety of surfactant classes may be used including without limitation, cationic, anionic, zwitterionic or non-ionic surfactants. One example of nonionic surfactants is secondary alcohol ethoxylates. Such compounds are commercially available, for example, from Union Carbide Co. (Houston, Tex.) producers of Tergitol.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Examples of other classes of surfactants those skilled in the art will readily recognize specific examples of the other classes of surfactants recited above, as well as any other suitable surfactants for use with the present invention.

The ink vehicle of the present ink composition may optionally include up to about 5 percent by weight of a biocide. In one aspect, the biocide may be present in an amount of up to about 1 percent by weight of the ink composition. In a further aspect, the biocide may be present in an amount of up to 0.2 percent by weight of the ink composition. Such amounts may be the result of a single biocide ingredient, or a mixture of two or more biocides.

Any of the biocides commonly employed in ink-jet inks, and known to those skilled in the art may be used in the practice of the present invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCARCIDE 250. In one aspect, the biocide is PROXEL GXL.

In addition to the above-recited ingredients, the present ink-jet ink composition may include a buffer agent. In one aspect, the buffer agent may be present in an amount of up to about 10 percent by weight of the ink composition. In another aspect, the buffer may be present in an amount of up to about 5 percent by weight of the ink composition. In yet another aspect, the buffer may be present in an amount of about 0.25 percent by weight of the ink composition. These amounts may be achieved using a single buffer agent, or a combination of buffer agents.

The buffers in the ink vehicle of the present composition are primarily used to modulate pH. Such buffers can be organic-based biological buffers, or inorganic buffers such as sodium phosphate. Furthermore, the buffers employed should impart a pH range of from about 4 to about 9 to the present ink composition. In one aspect, the pH may be from about 6 to about 8. In another aspect, the pH range may be from about 6.7 to about 7.1. Examples of acceptable organic buffers include without limitation, Trizma Base, available from companies such as Aldrich Chemical (Milwaukee, Wis.), 4-morpholineethanesulfonic acid, and 4-morpholinepropane sulfonic acid (MOPS). In one aspect, the buffer may be MOPS.

Metal chelator agents may be optionally included in the ink vehicle of the present ink composition. In one aspect, the metal chelator may be present in an amount of up to about 2 percent by weight. In another aspect, the metal chelator may be present in an amount of up to about 1 percent by weight of the ink composition. In a further aspect, the metal chelator may be present in an amount of up to about 0.5 percent of the ink composition. In yet another aspect, the metal chelator may be present in an amount of about 0.1 percent by weight of the ink composition. One or more metal chelators may be used to achieve these amounts.

Metal chelators employed in the practice of the invention are used to bind transition metal cations that may be present in the ink. A variety of metal chelators may be used in connection with the present invention as will be recognized by those skilled in the art. Examples of suitable metal chelators include without limitation, Ethylenediaminetetra acetic acid (EDTA), Diethylenetriaminepentaacetic acid, trans-1,2-diaminocyclohexanetetraacetic acid, (ethylenedioxy) diethylenedinitrilotetraacetic acid, and other chelators that bind transition metal cations. In one aspect, the metal chelator is EDTA.

In other embodiments of the present invention, a colorant may be added in addition to the phosphorescent material. The colorant may be a pigment or a dye. If the colorant is a pigment, it may be added, along with the phosphorescent material, prior to milling. The added pigment could thereby be deaggregated and dispersed along with the phosphorescent material. Pigments that could be used with the present invention include, but are not limited to, the pigments listed in U.S. Pat. No. 5,085,698, which is incorporated by reference.

By adding a colorant, one may use the ink composition of the present invention as a conventional ink that has phosphorescent properties. Accordingly, the ink composition of the present invention may be used for printing letters and images, which upon inspection would appear similar to other ink-jet inks. However, when desired, the ink composition may be energized to generate a phosphorescent image.

The following examples of a phosphorescent ink compositions are provided to promote a more clear understanding of the possible combinations of the present invention, and are in no way meant as a limitation thereon.

EXAMPLE 1

A phosphorescent ink composition was prepared by mixing 16.9% by weight ZnCdS:Cu and 4.2% by weight sodium dodecyl sulfate as a dispersant, with the balance being deionized water. Stainless steel balls were added as a grinding media and the mixture was milled according to conventional milling techniques until the phosphorescent material was an average particle size of less than about 5 micrometers.

EXAMPLE 2

A phosphorescent ink composition was prepared by mixing approximately 10% by weight ZnCdS:Cu and approximately 10% Permanent Yellow DHG by Hoechst (Yellow 12), in an ink vehicle comprising 3% by weight NUOSEPT 95, 1% by weight sodium phosphate, and the balance deionized water. Stainless steel balls were added as a grinding media and the mixture was milled according to conventional milling techniques until the phosphorescent material and yellow pigment was an average particle size of less than about 5 micrometers.

Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in materials, form, function and use may be made without departing from the principles and concepts set forth herein.

What is claimed is:

1. An ink composition for use in an ink-jet printer consisting of:
a mixture of an effective amount of a glow-in-the-dark phosphorescent powder having an average particle size of less than about 5 micrometers, a non-fluorescent colorant, and a liquid ink vehicle, said ink composition being formulated to phosphoresce in the visible spectrum, and further formulated for use in an ink-jet printer.

2. The ink composition of claim 1, further comprising an effective amount of a dispersing agent for maintaining disbursement of the phosphorescent powder in the ink vehicle.

3. The ink composition of claim 1 wherein the non-fluorescent colorant is a pigment.

4. The ink composition of claim 1 wherein the non-fluorescent colorant is a dye.

5. The ink composition of claim 1 wherein the ink vehicle comprises an aqueous or solvent base liquid and at least one ingredient selected from the group consisting of: surfactants, defoamers, biocides, cosolvents, conductivity, enhancing agents, anti-kogation agents and drying agents.

6. The ink composition of claim 1 wherein the amount of phosphorescent powder is between approximately 0.1 and 30% by weight of the ink composition.

7. The ink composition of claim 1 wherein the non-fluorescent colorant is between approximately 0.1 and 30% by weight of the ink composition.

8. A method of producing a glow-in-the-dark phosphorescent ink-jet ink composition comprising the step of:
mixing components consisting of an effective amount of a glow-in-the-dark phosphorescent powder and a non-fluorescent colorant with a liquid ink vehicle to form the phosphorescent ink-jet ink that phosphoresces in the visible spectrum, said phosphorescent powder having an average particle size of less than about 5 micrometers.

9. The method of claim 8 further comprising the step of adding an effective amount of a dispersing agent.

10. A method of claim 8 wherein the non-fluorescent colorant is a dye.

11. The method of claim 8 wherein the non-fluorescent colorant is a pigment.

12. The method of claim 8 wherein said mixing step further comprises milling.

13. The method of claim 8 wherein the ink vehicle comprises an aqueous or solvent base liquid and at least one ingredient selected from the group consisting of: surfactants, defoamers, biocides, cosolvents, conductivity enhancing agents, anti-kogation agents and drying agents.

14. The method of claim 8 wherein the amount of phosphorescent powder is between approximately 0.1 and 30% by weight of the phosphorescent ink-jet composition.

15. The method of claim 8 wherein the non-fluorescent colorant is between approximately 0.1 and 30% by weight of the phosphorescent ink-jet ink composition.

* * * * *